Feb. 9, 1932.   R. M. SUTPHEN   1,844,079
METHOD OF REPRODUCING PHOTOGRAPHS
Filed Nov. 23, 1928

INVENTOR
Robert Morris Sutphen
BY
Fred C. Fischer
ATTORNEY

Patented Feb. 9, 1932

1,844,079

UNITED STATES PATENT OFFICE

ROBERT M. SUTPHEN, OF NEWARK, NEW JERSEY, ASSIGNOR TO PFAFF AND KENDALL, OF NEWARK, NEW JERSEY, A CORPORATION OF NEW JERSEY

METHOD OF REPRODUCING PHOTOGRAPHS

Application filed November 23, 1928. Serial No. 321,519.

This invention relates to a method by which unskilled persons may accurately reproduce photographs.

The method by which photographs are made at present, for newspaper service, is well known and common. Such a method involves the making of a half-tone by photographing the photograph through a screen, and then the making of a copper or zinc plate by the action of light and chemicals, with the resulting plate showing the photograph reproduced thereon by means of dots of various sizes. When printed in a newspaper, the dots are not readily noticed, but when magnified their varying sizes are apparent.

Now, the life of a plate for printing such a photograph is relatively short when compared with the life of a plate for printing a pen and ink drawing, commonly known as a line-cut. Furthermore, the line-cut is more distinct and desirable, but heretofore they have been restricted in their use for newspaper work because they necessitate the services of a skilled artist and require considerable time for their reproduction, thus adding to the cost.

When a photograph is reproduced in pen and ink by an artist, it is not an accurate reproduction, for there is always the personal element of the artist, regardless of his skill.

It is therefore, an object of this invention to provide a method by which a line-cut of a photograph may be easily and readily made by persons unskilled as artists.

It is a further object to provide a method for distinctly reproducing a photograph so that it may be used for large display advertisements, mosaic work, and in other situations if an accurate reproduction of a photograph may be desired.

Figure 1:
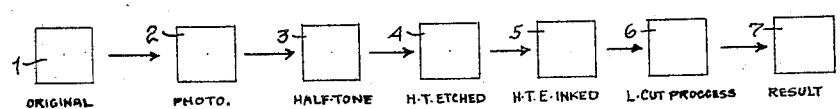
Figure 2:
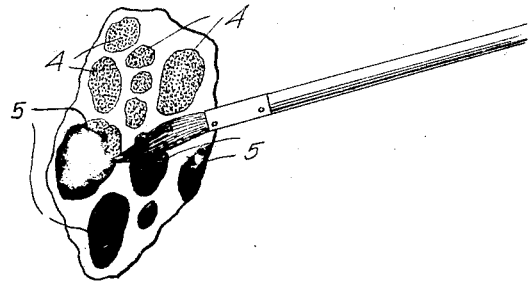

These and other objects are attained by the novel method, the steps of which are hereinafter set forth and illustrated in the accompanying drawings, forming part thereof, and wherein:

Fig. 1 represents a graphic representation of the process or method employed by applicant for reproducing photographs, and Fig. 2 represents a plan view of an enlarged section of a half-tone photograph reproduction, showing the manner of filling in the dots of the reproduction with black ink applied by the use of a brush.

The well-known process commonly used for the production of newspaper print by the photographing 2 of the original and producing an etched half-tone plate, consists in photographing the original through a half-tone screen so that from the original 1 a half-tone photograph 3 is obtained, which is identical with the ordinary photograph except that the photograph 3 will contain only white lines where the screen covered or hid the portion of the original in the path of the screen.

The half-tone negative 3 is turned and placed in contact with a metal, on which the negative is printed, and then the metal plate is etched by a chemical process, producing the half-tone etched plate 4, from which a print is made; the dots and spots of a photographic enlargement of the half-tone print are covered with black ink, to produce the black and white print 5, which is now substantially the same as a pen and ink drawing and which may then be carried through the well-known line-cut process indicated at 6, to produce a sharp and distinct line-cut 7, which is an exact and accurate reproduction of the original photograph.

Fig. 2 represents a fragmentary section of a half tone reproduction of a copy, showing the dots and spots 4 made from the usual half-tone etched plate print, and the result of employing applicant's process or method in covering the dots and spots with black ink, those covered being indicated by the numerals 5.

In the reproduction of a photograph for newspaper work, a half-tone cut is made from the photograph desired to be reproduced. From this half-tone cut a plate is made from which the reproduced photograph may be printed in a newspaper. The method of making the half-tone cut and the printing plate are common and well known to persons skilled in the art of printing and consequently form no part of my invention.

It will be noted that the reproduced photograph, as printed in a newspaper, consists of many dots of varying sizes which ordinarily are not noticed. However, when such a print is enlarged three or four times, the dots of varying sizes are readily apparent; but they are grey and not sharp and outstanding. That is, the enlargement of the print has a blurred appearance and is indistinct in many respects.

In accordance with my invention, the dots of varying sizes on such an enlargement of the newspaper print are filled in with black ink, with the result that the photographic enlargement now appears as a pen and ink drawing having sharp and distinct lines, from which a "line-cut" may be made for printing purposes if so desired. It is well known that a line-cut is preferred to other cuts made of photographs in which the half-tone method is employed, the line-cut being more durable and providing a sharper and more distinct appearance. Heretofore, no method of producing a line-cut from a photograph has been devised; but it is obvious that the method described above enables an accurate reproduction of a photograph so that a line-cut may be made thereof.

It will be noted that the services of a skilled artist are not necessary inasmuch as the dots on the enlargement may be filled in with black ink by unskilled persons, since all that they have to do is to follow the outlines of the dots. It is also obvious that a personal element, always present in pen and ink reproduction of photographs, is entirely eliminated. In other words, the pen and ink reproduction obtained by my method is exact and accurate as to all details.

The method herein described is not confined to the printing art, but may be advantageously used in mosaic work, in situations wherein an exact reproduction of a photograph is desired. The method is also applicable for the accurate reproduction on a very enlarged scale of photographs for advertising purposes on large outdoor signs in situations wherein such signs are positioned at a considerable distance from the observer. In making such large signs, an enlargement would be made of sections of a newspaper print, and enlarged sections copied accurately by a painter upon the sign board. No particular skill of the painter would be required, inasmuch as all that he has to do is to properly copy the enlarged dots of varying sizes in their proper positions as indicated by the photographic enlargement of the newspaper print.

From the above description it will be apparent that I have presented a novel method which enables the accurate pen and ink reproduction of a photograph from which linecuts may be made, the method not necessitating the services of a skilled artist and involving in no way the personal characteristics heretofore connected with pen and ink reproductions of photographs.

Having thus described my invention, what I desire to protect by Letters Patent is:

The method of accurately reproducing a photograph to make a line-cut therefrom, comprising making a half-tone print of the photograph, enlarging the half-tone print photographically so that the dots and spots thereon are readily perceivable, then filling in all and only the area occupied by each and all of the dots or spots with black ink to produce an exact reproduction of the photograph in black and white from which a line-cut print may be made by the usual line-cut process.

This specification signed this 16th day of November, 1928.

ROBERT M. SUTPHEN.